United States Patent [19]

Burelsmith

[11] Patent Number: 4,584,200
[45] Date of Patent: Apr. 22, 1986

[54] LIVESTOCK FEED PRODUCT AND METHOD AND APPARATUS FOR MANUFACTURING SAME

[76] Inventor: Emmitt B. Burelsmith, Box 879, Levelland, Tex. 79336

[21] Appl. No.: 518,942

[22] Filed: Aug. 1, 1983

[51] Int. Cl.$^4$ .............................................. A23K 1/22
[52] U.S. Cl. ..................................... 426/69; 426/73; 426/304; 426/512; 426/635; 426/807
[58] Field of Search ................... 426/69, 72, 73, 89, 426/93, 274, 285, 289, 292–293, 297, 304–305, 635, 630, 454, 502, 512, 807; 100/100, 72, 73, 74, 75

[56] References Cited

U.S. PATENT DOCUMENTS

| | | | |
|---|---|---|---|
| 1,196,138 | 8/1916 | Muller | 99/534 |
| 1,580,988 | 4/1926 | Allstott | 99/534 |
| 1,628,850 | 5/1927 | Klein | 99/534 |
| 2,744,824 | 5/1956 | Lent | 426/635 X |
| 2,836,211 | 5/1958 | Wetmore | 146/106 |
| 3,075,456 | 1/1963 | Uschmann | 100/71 |
| 3,230,902 | 1/1966 | Grimm et al. | 100/74 |
| 3,450,033 | 6/1969 | Bornzin | 100/100 |
| 3,537,866 | 11/1970 | Weller et al. | 426/274 X |
| 3,654,048 | 4/1972 | Bathgate | 100/73 X |
| 3,721,183 | 3/1973 | Dunlea | 100/74 X |
| 3,729,107 | 4/1973 | Present | 100/73 X |
| 3,749,003 | 7/1973 | Wilkes | 100/226 X |
| 3,834,141 | 9/1974 | Bracht et al. | 100/73 X |
| 3,941,047 | 3/1976 | Orlando et al. | 100/226 X |
| 3,949,036 | 4/1976 | Nelson | 100/74 X |
| 4,055,680 | 10/1977 | Duke | 426/635 |
| 4,060,363 | 11/1977 | Nelson | 100/74 X |
| 4,132,807 | 1/1979 | Duke | 426/635 X |
| 4,228,637 | 10/1980 | Richey | 426/319 X |
| 4,228,638 | 10/1980 | Rabe et al. | 100/74 X |

*Primary Examiner*—R. B. Penland
*Attorney, Agent, or Firm*—Glaser, Griggs & Schwartz

[57] ABSTRACT

A livestock feed block comprising a compacted mass of cotton burr and other residue produced in the process of ginning cotton. The burr is compacted in a mold apparatus including a movable power operated tamping or compacting ram fitted with a spray manifold for coating the feed block material with a settable liquid binder prior to the compaction process. Compaction is carried out in a series of steps to compact plural layers of material to build the feed block in the mold. The mold is supported on retractable transport wheels which provide for jacking the mold upward off the ground surface to release the block whereby it may be transported by motor truck from its point of manufacture to its point of use.

6 Claims, 11 Drawing Figures

LIVESTOCK FEED PRODUCT AND METHOD AND APPARATUS FOR MANUFACTURING SAME

BACKGROUND OF THE INVENTION

1. Field of the Invention

The present invention pertains to a livestock feed product comprising the residue from cotton ginning processes wherein the residue, primarily cotton burr, is compacted and bound into an edible block using a settable liquid binder. The compaction apparatus is adapted to progressively build a large feed block by spraying liquid binder on and compacting multiple layers of the residue or burr.

2. Background

In spite of the inroads made by synthetic fibers, the production of cotton for the textile industry and other applications provides millions of pounds of processed fibers annually. The separtion of the cotton fiber from the cottom boll produces substantial quantities of residue material comprising various portions of the cotton plant such as small portions of the plant stem or stalk, leaves, and primarily the hull or husk of the cotton boll, commonly known as burr. This material is, of course, separated from the cotton fibers in the ginning process. The residue material is produced in relatively large quantities by the ginning process and, unlike the cottonseed, has not previously been considered to have commercial value.

There have been several problems associated with the disposition of cotton gin residue or burr which, heretofore, has resulted in added expense to the gin operator. For example, the sheer quantity of burr produced by a conventional cotton gin contributes to its disposal costs. Moreover, even though this residue has some nutritional value as a feed material, the expense previously associated with handling the material has not been justified when attempting to convert the material to livestock feed. However, the cost associated with the production of other types of livestock feed in recent years and the developments associated with the present invention have produced a livestock feed product which is unique and which is economically manufactured using a novel apparatus and method as will be appreciated by those skilled in the art.

SUMMARY OF THE INVENTION

The present invention provides an improved livestock feed product comprising edible residue from the cotton ginning process, primarily the hull or burr of the cotton boll after separation from the cotton fibers.

In accordance with one aspect of the present invention there is provided a livestock feed product comprising a loaf or block of compacted cotton gin residue or burr which is edible by livestock and is provided with a binder material which, together with the compaction process, produces a substantially solid cohesive mass which may be easily transported from the point of manufacture to a point of use such as a feed pen or grazing area for livestock.

In a preferred embodiment of the livestock feed product of the present invention a relatively large loaf or block is produced by an inventive process or method which includes compacting multiple layers of cotton gin residue which are sprayed with a liquid binder comprising a molasseslike liquid including a mixture of phosphates, vitamins A and D, urea, water and a suitable preservative. The liquid binder is preferably sprayed over a previously deposited layer of residue or burr whereupon additional unsprayed residue is then deposited on top of the already sprayed or soaked layer and a compaction process is carried out. The compaction process is repeated in terms of depositing a layer of residue material, spraying the layer to thoroughly wet the material, adding additional unsprayed material to the top of the sprayed layer and then compacting the material using a retractable ram in combination with a portable mold apparatus. The compaction process is preferably carried out in several repeated steps to build one layer on top of the other until a relatively large block or loaf of bound and compacted burr is obtained. After a suitable binder setting or hardening time elapses, the feed block comprises a substantially cohesive solid mass which may be handled by a suitable transport vehicle for transportation to a livestock feed area.

The unique manufacturing process of the present invention also includes the provision of an improved molding and compacting apparatus fitted with means for spraying liquid binder on the burr prior to compaction of each layer. The process of the present invention further contemplates the steps of removing the cohesive feed block from the mold and loading it aboard a transport truck having a movable load floor for loading and unloading the feed block.

In accordance with yet another aspect of the present invention there is provided an improved apparatus for compacting and manufacturing a livestock feed product comprising primarily cotton burr, said apparatus being characterized by a relatively large mold structure provided with a power actuated compacting ram supported on and movable along the mold to compact the material deposited in the mold. The compaction ram is also provided with a spray bar or manifold comprising a plurality of spaced apart spray nozzles for spraying a liquid mixture of binder and nutrients onto the material placed in the mold to bind the material after it is compacted to form a cohesive solid block or loaf of livestock feed product.

Those skilled in the art of livestock feed products, and in particular a product using cotton burr and other cotton gin residue, will appreciate the salient features of the present invention described hereinavove as well as other superior aspects of the invention upon reading the detailed description which follows in conjunction with the drawing.

DESCRIPTION OF THE PREFERRED EMBODIMENTS

Figure 1:
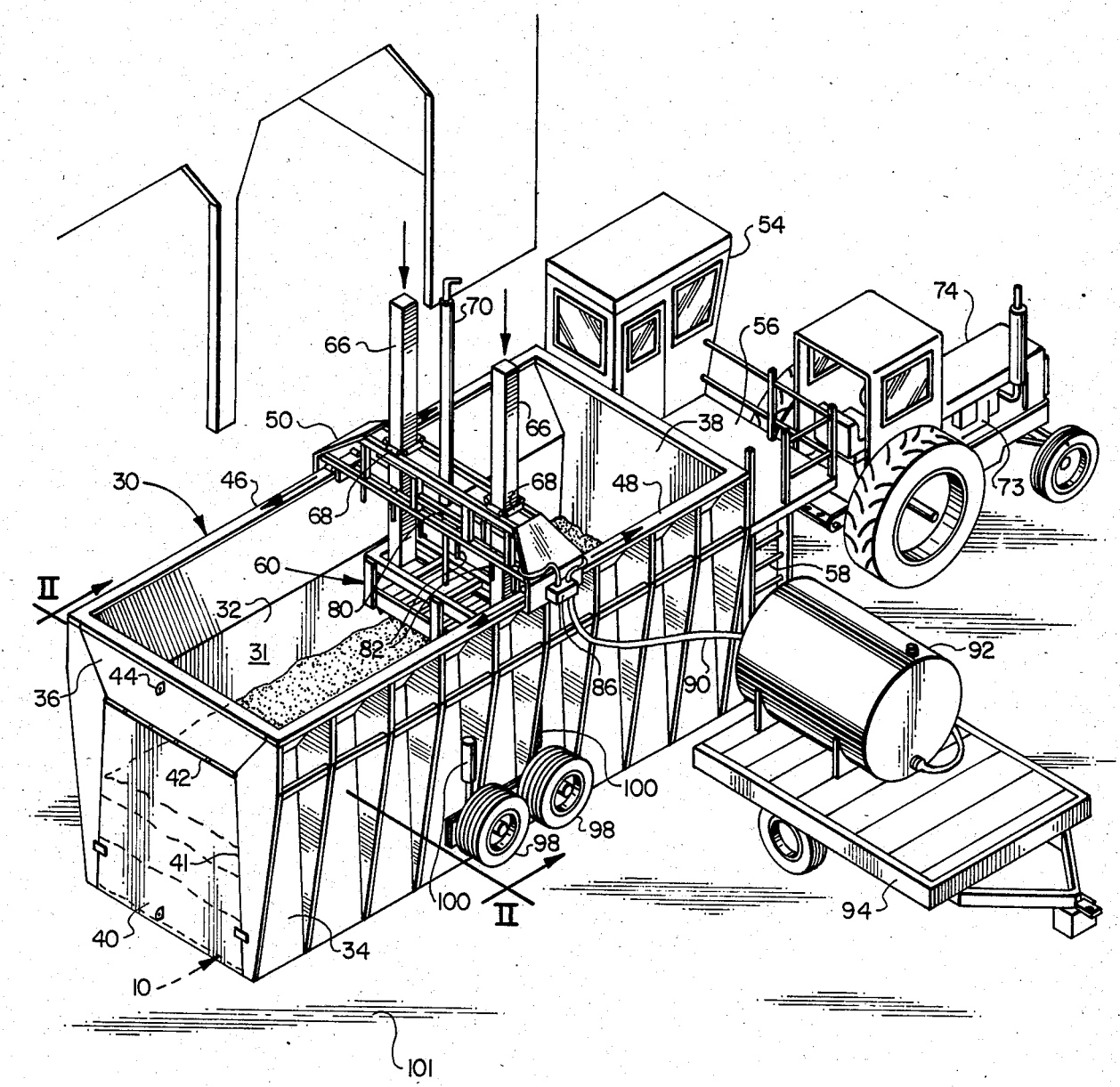
FIG. 1 is a perspective view of an apparatus for producing the improved livestock feed product of the present invention.

In the description which follows like parts are marked throughout the specification and drawing with the same reference numerals, respectively. The drawing is not necessarily to scale and certain features of the invention may be shown exaggerated in scale or in somewhat schematic form in the interest of clarity and conciseness.

In the preparation of cotton fibers for the manufacture of textiles and other uses, the cotton boll is separated from the plant and then processed to separate the fibers from the hull or husk portion of the boll by the well known ginning process. The residue which is left after extraction of the cotton fibers and a substantial portion of the seeds includes the aforementioned hull or husk structure, also known as burr, as well as other parts of the cotton plant such as small portions of leaves and pieces of the stalk which are inadvertently carried through the ginning process. This residue accumulates in substantial quantity as a result of the operation of a cotton gin and has heretofore been disposed of in various ways as befits a substance thought to have no commercial value.

However, in accordance with the present invention I have discovered that the aforementioned cotton residue, comprising primarily cotton burr, may be formed into a cohesive block or loaf of compacted material bound with a molasseslike liquid binder, including certain nutritive ingredients, to thereby provide a valuable livestock feed product. This product, in accordance with a preferred embodiment of the present invention, is produced as a relatively large somewhat rectangular solid block or loaf, illustrated and generally designated by the numeral 10 in FIG. 8 of the drawing. The feed block 10 is preferably provided by plural compacted layers of residue material, which layers are designated by the numerals 12, 14, 16, 18 and 20, and which are sprayed or otherwise saturated with a binder comprising a liquid mixture of poly-n phosphate, vitamins A and D, and urea mixed with water and including small quantities of a suitable preservative such as silage inoculator. A preferred formula for the binder comprises the following quantities:

68 lbs. of poly-n phosphate
0.11 oz. (avdp) of vitamin A
0.11 oz. (avdp) of vitamin D
150 lbs. of urea
2 oz. (avdp) of silage inoculator (preservative)
150 gal. of water.

The number of layers required to obtain a block such as the block 10 may be varied in accordance with the specific detailed manufacturing steps in accordance with the present invention, although a typical feed block, such as the block 10, may be approximately 32 feet long, 8 feet wide, and 8 feet in thickness or height. Such a product requires transport from the manufacturing point to a point of use by motor truck or a similar transport vehicle.

Figure 8:
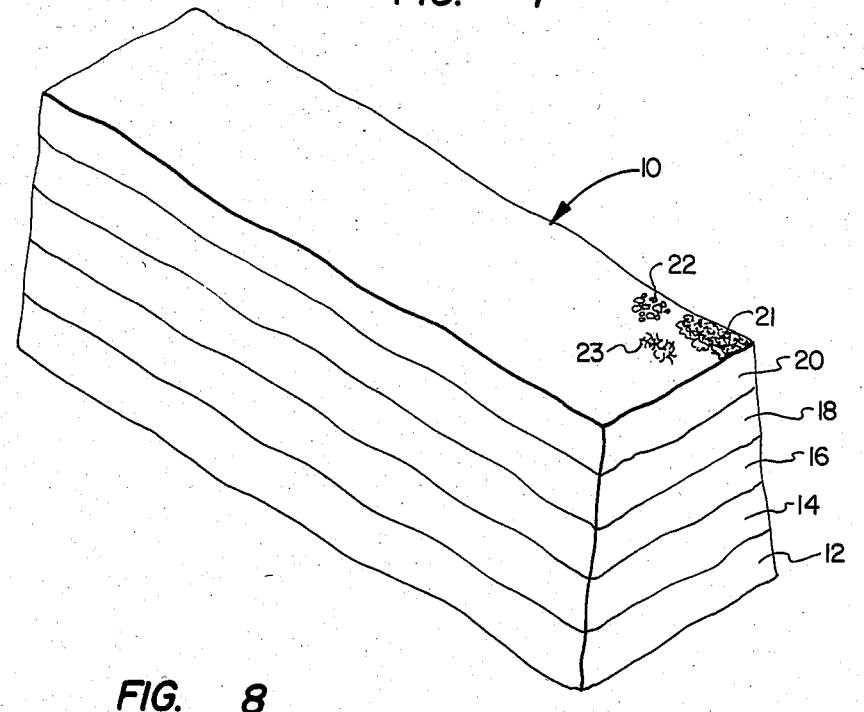
FIG. 8 is a perspective view of a feed block in accordance with the present invention.

The feed block 10 is comprised of compressed or compacted cotton burrs 21, as indicated in FIG. 8, together with other cotton plant residue such as leaves 22 and stalk portions 23 which are unavoidably entrained with the cotton bolls during the picking process and are separated from the cotton fibers during the ginning process. The binder coating and compaction process is carried out in accordance with a preferred method of manufacturing the feed block 10 also in accordance with the present invention and which will be described in further detail herein.

Figure 2:
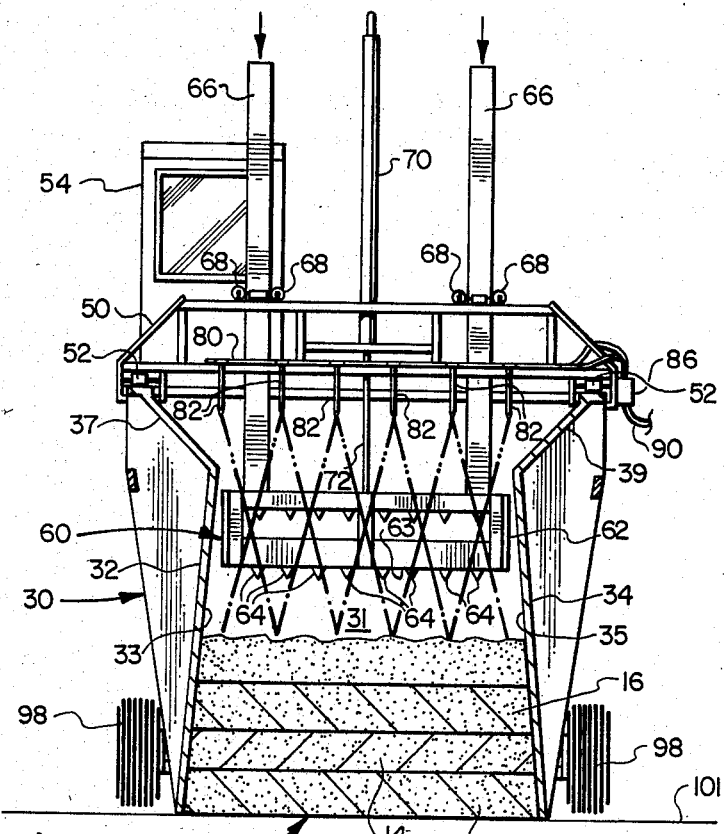
FIG. 2 is a section view taken along the line II—II of FIG. 1.

Referring now to FIGS. 1 and 2, there is illustrated a portable mold apparatus, generally designated by the numeral 30, comprising a large, generally rectangular, bottomless and topless metal container having opposed sidewalls 32 and 34 and endwalls 36 and 38 defining a cavity 31. As shown in FIG. 2, the sidewalls 32 and 34 have respective smooth inner wall portions 33 and 35 which diverge away from each other downwardly toward the open bottom of the mold 30. The sidewalls 32 and 34 also include upper slope sheet portions 37 and 39 intersecting the diverging sidewalls portions 33 and 35. A portion of the endwall 36 is formed as a hinged door 40, FIG. 1, which is hinged at 42 to an upper portion 44 of the endwall 36. The hinge axis of the hinge 42 is generally aligned with the intersection of the respective slope sheets 37 and 39 with the sidewall portions 33 and 35. The upper edges of the sidewalls 32 and 34 are provided with respective longitudinal parallel flanges 46 and 48 which are in supportive relationship to a bridge 50 extending between the sidewalls 32 and 34. The bridge 50 is configured as a truss type structure of conventional design and is provided with suitable means for power traversal of the bridge reversalby along the flanges 46 and 48, such as power roller means 52 supported on the respective flanges 46 and 48, as indicated in FIG. 2. The rollers 52 are operable to traverse the bridge 50 along the top of the mold 30 between the endwalls 36 and 38. The rollers 52 are suitably powered by hydraulic motor means or the like, not shown, which may be controlled by an operator of the mold apparatus 30 from an operator control station or cab 54 supported at one end of the mold apparatus. The cab 54 is accessible from the deck 56 and a boarding ladder 58.

The mold 30 is also provided with power actuated compaction means comprising a hydraulically actuated ram 60 having a generally rectangular boxlike head portion 62. The head 62 includes a generally horizontal rectangular compaction surface 63 and a plurality of downwardly depending spaced apart triangular shaped projections 64 which facilitate the compaction of relatively loose bulk material such as the cotton gin residue described herein. The ram 60 is provided with two vertically extending guide columns 66 which extend from the head 62 upward through the bridge 50 and are each journalled with respect to the bridge by sets of opposed guide rollers 68 mounted on the bridge as shown in FIGS. 1 and 2. A hydraulic cylinder 70 is mounted on the bridge 50 and includes a linearly extensible piston rod 72 connected to the head 62 for extending and retracting the ram with respect to the mold cavity 31. The cylinder 70 is also adapted to be controlled from the operator's cab 54 and is suitably connected to a source of hydraulic pressure fluid which may include a hydraulic pump, not shown, driven by the engine 73 of a tractor 74, FIG. 1, associated with the mold apparatus 30.

The mold apparatus 30 is uniquely adapted to provide means for applying a coating of the liquid binder described hereinabove to the layers of residue forming the feed block 10 as the layers are formed in the mold cavity 31 in accordance with the inventive method of manufacturing the feed block. The bridge 50 is fitted with at least one elongated tubular manifold 80, see FIG. 2, extending generally horizontally across the bridge above the cavity 31 and including a plurality of spaced apart downwardly depending spray nozzles 82. The manifold 80 is in communication with a connector block 86 mounted on the side of the bridge 50 adjacent to the sidewall 34, as indicated in FIGS. 1 and 2. The connector block 86 is connected by way of a flexible conduit 90 to a tank 92 preferably mounted aboard a trailer 94. The connector block 86 is also adapted to connect hydraulic lines, not shown, for the cylinder 70 to the source of hydraulic fluid aboard the tractor 74 so that the bridge 50 may be traversed along the top of the mold apparatus 30 and allow the manifold 80 and cylinder 70 to be in communication with their respective sources of fluid. The tank 92 is adapted to receive a substantial quantity of the liquid binder and is also preferably provided with suitable pump means, not shown, for pumping the liquid binder through the conduit 90 to the connector block 86 and the manifold 80 for forcible discharge of the binder through the respective spray nozzles 82. The tank 92 and its associated pump may also be mounted onboard the mold apparauts 30 such as on or below the deck 56. However, the quantity of liquid binder normally used in manufacturing feed blocks 10 is sufficient as to require a separate tank 92 transportable by its own vehicle such as the trailer 94.

The mold apparatus 30 is preferably adapted for transport between sources of material for manufacturing the feed blocks 10 such as the cotton gin shown in FIG. 1 and the like. Accordingly, the mold appartus 30 is adapted for transport by a vehicle such as the tractor 74 and is provided with an undercarriage comprising opposed sets of trailer wheels 98 as indicated in FIGS. 1 and 2. The wheels 98 are adapted to be supported for retraction by pressure fluid cylinder actuators 100, as shown by way of example in FIG. 1, so that the mold apparatus may be set directly on the ground surface 101, as indicated in FIGS. 1 and 2, to utilize the ground surface as part of the mold. When it is desired to transport the mold apparatus 30 from one location to another the actuators 100 are extended to place the wheels 98 in engagement with the ground and to elevate the mold container so that the sidewalls 32 and 34 and endwalls 36 and 38 of the container are provided with some ground clearance. Moreover, the extension of the wheel assemblies 98 to engage the ground and effect raising of the mold container above the ground provides for a releasing action to release the mold from a feed block 10 so that the block may be extracted from the mold cavity 31 through the door 40.

When it is desired to manufacture a feed block 10 the mold apparatus 30 is placed in operation by positioning the mold apparatus in a desired location on a fairly level and smooth ground surface such as the surface 101. The wheels 98 are then retracted to place the mold container in direct engagement with the ground surface so that the bottom wall of the cavity 31 is formed by the ground surface itself and the lower edges of the sidewalls 32 and 34 and the endwalls 36 and 38 are contiguous with the ground surface. The door 40 is suitably latched in the closed position to form a solid endwall structure of the endwall 36.

Figure 3A:
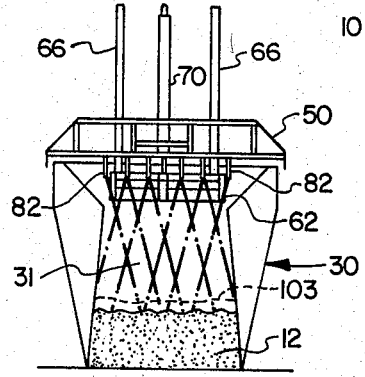
FIGS. 3A through 3D are views taken from the same line as the view of FIG. 2 and showning in somewhat schematic form the process of manufacturing the feed block.

Cotton gin residue comprising primarily cotton burr may be supplied to the mold cavity 31 by various means including mechanical and/or pneumatic conveying equipment, no shown, so that a suitable quantity of residue may be deposited in the mold cavity 31. In accordance with a preferred process of manufacturing the feed block 10, the block is compacted in several layers of material which are sprayed with the liquid binder discharged from the tank 92 through the spaced apart spray nozzles 82. The bridge 50 is preferably initially positioned at one end of the mold container to permit loading of a layer of residue material into the mold cavity 31 by any of the aforementioned means. When a layer of feed block material or residue such as the layer 12 has been deposited in the mold cavity 31, as indicated in FIG. 3A, the bridge 50 is slowly traversed across the mold container from one endwall toward the other while liquid binder is discharged from the tank 92 through the conduit 90, the manifold 80 and the respective spray nozzles 82, as indicated schematically in FIG. 3A, to thoroughly wet or coat the aggregation of material in the bottom of the mold cavity. Upon completion of the coating process, additional dry residue is discharged into the mold cavity 31 to cover the layer 12 as indicated by the numeral 103 in FIG. 3A. This additional material will eventually comprise part of the compacted layer 14, however, the step of spraying this portion of the layer 14 with liquid binder is not carried out until after compaction of the layer 12 and a portion of the layer 14.

Figure 3B:
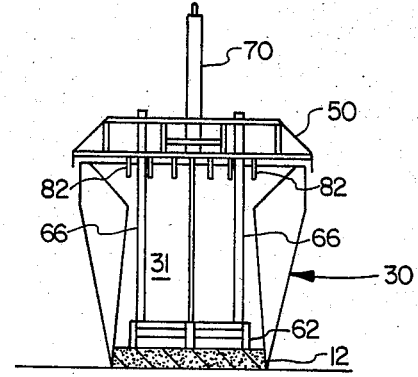

After deposition of a relatively thin layer of residue 103 on top of the coated layer of residue 12, the ram 60 is extended by its cylinder 70 in a series of tamping or compacting steps along the mold cavity 31 to compact the layer 12. By covering the saturated layer 12 with a relatively thin layer of dry residue, the ram head 62 does not come into direct contact with the wet sticky mass comprising the layer 12 and, accordingly, the compacted layer remains relatively uniform, of even thickness, and the material does not adhere or stick to the ram head 62. FIG. 3B illustrates one step in the compaction process whereby the head 62 has been extended by its associated cylinder 70 to compact or compress the layer 12. The width of the head 62 will, of course, determine the number of repeated compaction steps which must be conducted to fully compact one of the feed block layers along its entire length. Moreover, in place of the deposition of a layer of uncoated material on top of a layer of coated material prior to the compaction process, the head 62 and the wall portions 33 and 35 may be coated with a suitable release agent to prevent sticking of the coated material to the ram 60 and to the sloping sidewalls of the mold.

Figure 3C:
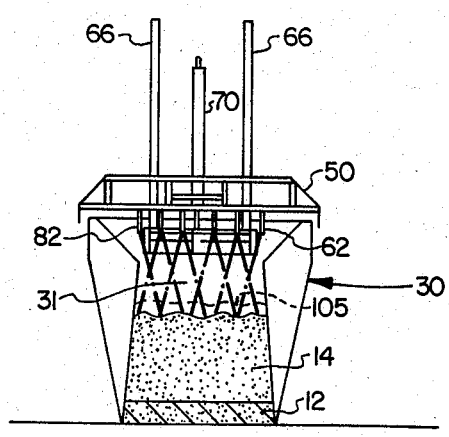
Figure 3D:
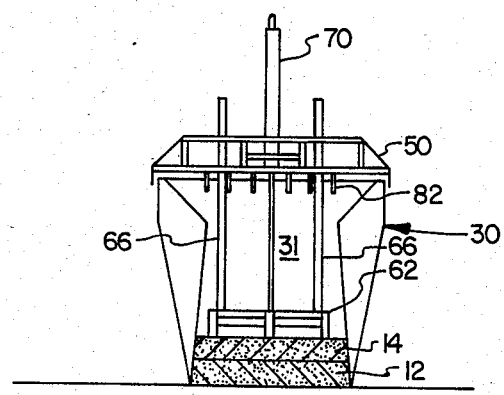

After the formation of the first feed block layer 12 an additional quantity of residue is deposited in cavity 31 to form the requisite thickness for the layer 14. In a preferred embodiment of a feed block 10 the layers 12, 14, 16, 18 and 20 are about two feet thick when compacted which results from an uncompacted thickness of about eight feet. As indicated in FIG. 3C, the bridge 50 is then traversed along the length of the mold cavity 31 to spray liquid binder onto the material comprising the layer 14 to provide a thorough coating of binder material on the residue. After the layer 14 is coated an additional relatively thin layer of dry residue material 105 is deposited on top of the layer 14. Although the layers 103 and 105 are shown in conjunction with the spraying operation it will be understood that the material comprising these layers is deposited on top of the respective layers 12 and 14 after the spraying of the liquid binder onto the underlying layer of material in the cavity 31 is ceased.

After completion of the spraying and application of the thin dry material layer 105 the ram head 62 is operated in a series of extension and retraction steps along the cavity 31 to compact and form the layer 14. The sequence described above for forming the layers 12 and 14 is, of course, repeated until the top layer of the feed block is compacted. The formation of the last or top layer 20 may or not include the initial deposition of a relatively thin layer of dry material on top of the loose coated material in the mold cavity as described above for the formation of the previous layers. If the thin layer of dry material is deposited on top of the already coated layer, upon completion of the compaction process, the bridge 50 is again traversed the length of the mold apparatus 30 while operation of the liquid binder spraying apparatus is carried out to saturate and coat the relatively thin top layer of material to permit it to bind to the compacted layer directly below.

It is contemplated in accordance with the present invention that the manufacture of the feed block 10 is carried out as regards the formation of the respective layers 12, 14, 16, 18 and 20 while the binder is still primarily in a molasseslike liquid or substantially tacky state. The compacted mass forming the feed block 10 is then allowed to set until binder has drived sufficiently to form a cohesive or bound semirigid mass not unlike a loaf of bread. For the dimensions given herein for the feed block 10 and the binder formula stated the normal hardening time at an ambient temperature of 80° F. is about ten hours.

Upon setting of the liquid binder to form the cohesive block 10, the door 40 is released to allow the door to pivot freely about its hinge 42 to an open position, and the actuators 100 are extended to cause the wheels 98 to engage the ground and raise the container of the mold apparatus 30 at least slightly above the ground surface. The operation of raising the mold apparatus 30 will effect its release from the feed block 10 which remains on the ground surface 101 whereby the block may then be extracted from the mold cavity 31 by being pulled through the doorway 41. The feed block 10 may then be loaded on a transport vehicle for transport to a feedlot or other point of use.

Figure 4:
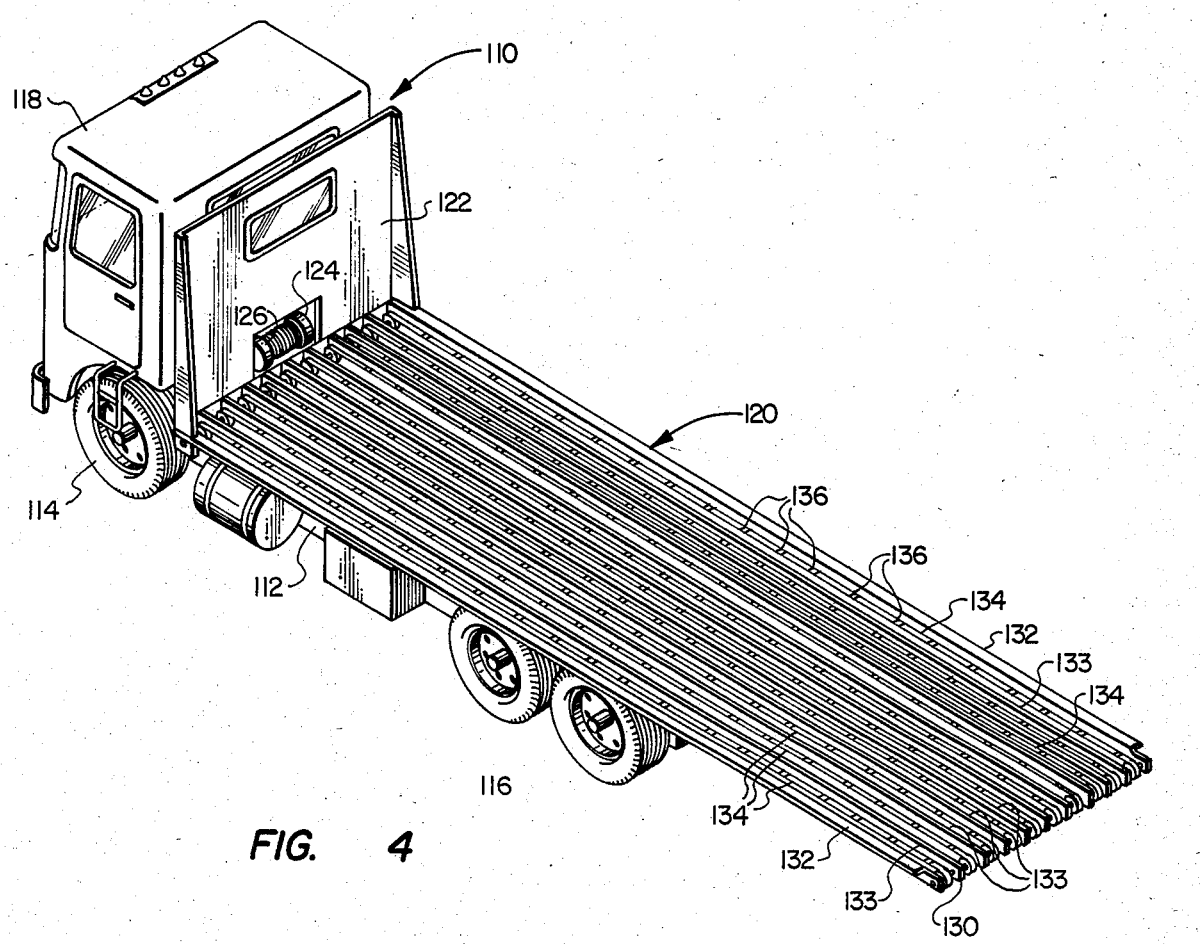
FIG. 4 is a perspective view of a transport vehicle for transporting the feed block.

Referring now to FIGS. 4 through 7, there is illustrated a preferred method of removing the feed block 10 from the mold apparatus 30 and transporting it to a point of use. FIG. 4 illustrates a preferred transport vehicle for the feed block 10 comprising a motor truck 110. The truck 110 is provided with a conventional chassis 112 including a rubbertired front steering axle assembly 114 and a conventional rear dual wheel rubbertired tandem axle assembly 116. The truck 110 is of a conventional cab over engine design having an operator's cab 118 and a conventional propulsion system, not shown, for driving the axle assembly 116. The transport vehicle comprising the truck 110 also includes an elongated load support bed, generally designated by the numeral 120, having forward bulkhead 122 provided with a suitable opening 124 in which is disposed a power operated cable winch 126. The bed 120 is adapted to be tilted about a hing 125 see FIG. 5 also, by a suitable bed tilting mechanism 128. In this way, the rear end 130 of the load support bed may be placed contiguous with the ground surface 101 to facilitate loading and unloading the feed block 10 with respect to the truck 110. The load support bed 120 preferably comprises a movable conveyor type load support floor formed by a plurality of elongated fixed frame rails 132–133 which are spaced apart from each other and are adapted to support therebetween endless conveyor chain assemblies 134. The chain assemblies 134 may each be provided with spaced apart gripper members 136 engageable with the bottom surface of a load supported on the load support bed to facilitate loading and unloading operations. The conveyor chain assemblies 134 are trained over suitable sprockets, not shown, at opposite ends of the bed 120, and the chain assemblies may be power operated to convey a load onto and off of the bed 120.

Figure 5:
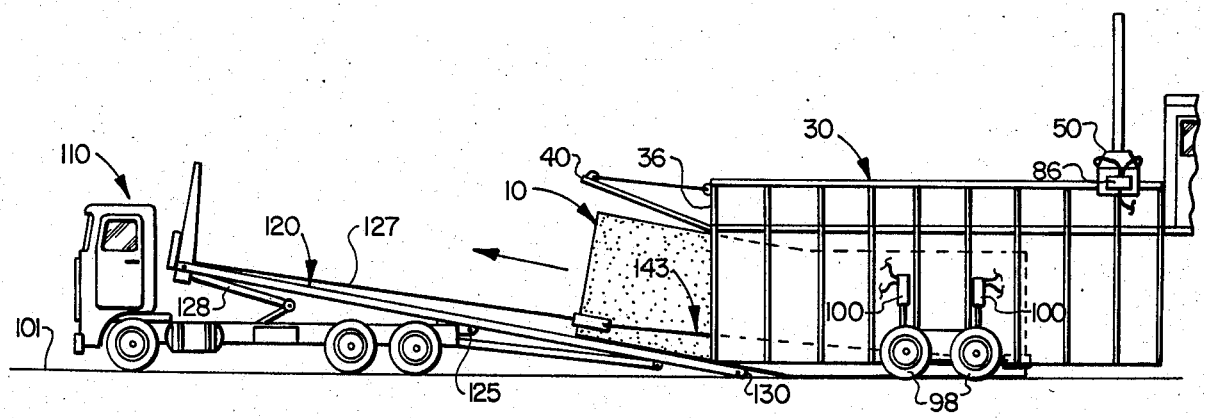
FIG. 5 is a side elevation showing the completed feed block being loaded onto the transport vehicle shown in FIG. 4.

As illustrated in FIG. 5, the transport truck 110 is positioned adjacent the endwall 36 of the mold 30 with the load support bed 120 in its tilted position so that the rear end 130 of the bed is in contact with the ground surface 101 and directly adjacent the opening 41. With the door 40 opened and the mold apparatus 30 jacked up above the ground surface 101 by extension of the wheel assemblies 98, a suitable loading harness 143 is placed around the feed block 10 and connected to a winch cable 127 whereby the feed block may be withdrawn from the mold and loaded onto the load support bed 120 utilizing the winch cable 127 and the powered conveyor chains 134.

Figure 6:
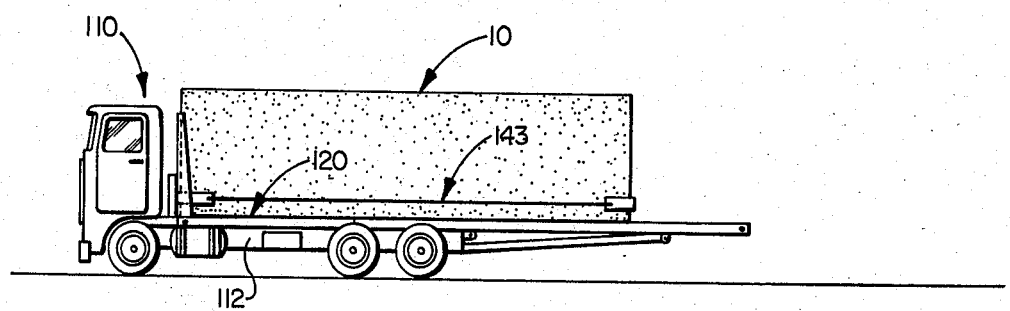
FIG. 6 is a side elevation showing the feed block mounted on the transport vehicle and in transit to a destination.
Figure 7:
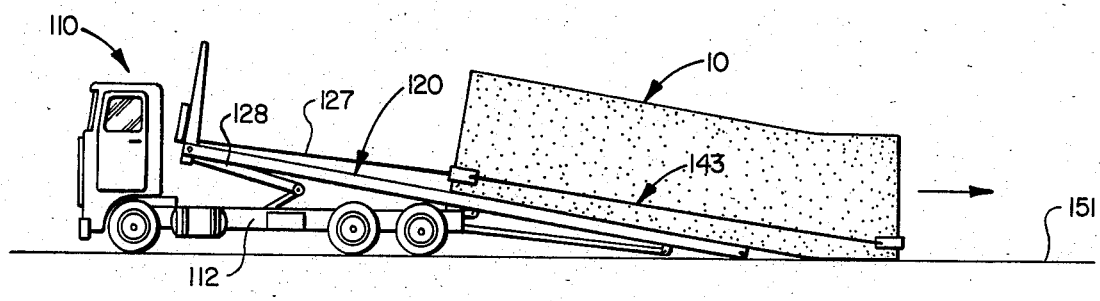
FIG. 7 is a side elevation showing the feed block being unloaded from the transport vehicle.

FIG. 6 illustrates the loaded position of the feed block 10 with the load support bed 120 retracted into its over-the-road transport position whereby the truck 110 may be operated to transport the block to a suitable destination. Upon reaching the destination for use of the feed block 10, as indicated in FIG. 7, the load support bed 120 is again moved into its tilted position with the trailing end 130 in contact with the ground surface 151 whereby the feed block 10 may then be easily off loaded by gravity or by power operation of the conveyor chain assemblies 134. The feed block 10 is preferably restrained for controlled off loading by the winch cable 127 and harness 143. After deposition of the feed block 10 at its point of use, the harness 143 is removed and the feed block is ready for use as a source of livestock feed.

From the foregoing description it will be appreciated that the present invention provides a unique livestock feed product which advantageously utilizes material which has heretofore presented a disposal problem. The use of a settable or hardenable liquid binder in combination with the mold apparatus 30 and the process of the present invention provides a product which is palatable to livestock, offers nutritional value and provides a commercially viable product from material which has heretofore presented costly disposal problems.

Although preferred embodiments of the product, the method of manufacture and the apparatus for producing the product have been described herein, those skilled in the art will appreciate that various substitutions and modifications may be made to the present invention without departing from the scope and spirit thereof as recited in the appended claims.

What I claim is:

1. A method of manufacturing a livestock feed product comprising a quantity of residue from ginning cotton, a major portion of said residue comprising cotton burr, said method comprising:
   providing a mold having opposed sidewalls and endwalls forming a mold cavity;
   pouring a quantity of said residue into said mold;
   applying a coating of a settable liquid binder to said quantity of said residue;

compacting said quantity of residue coated with said binder;

said coated residue being compacted in a series of layers one formed on top of another, each layer being formed by pouring a quantity of residue into said mold cavity generally evenly distributed therein to form a layer, applying liquid binder on said residue forming a layer, and compacting said layer after applying said liquid binder thereon.

2. The method set forth in claim 1 wherein the step of applying said liquid binder comprises:

providing a manifold mounted on said mold and connected to a source of said liquid binder, said manifold including a plurality of downwardly directed spray nozzles, and traversing said manifold along said mold and spraying liquid binder on said layer of residue in said mold.

3. The method set forth in claim 1 including the step of:

pouring an additional quantity of residue into said mold cavity on top of a layer of residue after applying said liquid binder onto said residue layer and before compaction of said layer.

4. The method set forth in claim 1 including the steps of:

allowing said liquid binder to set to form a cohesive block of said residue forming said product, removing said block from said mold, and transporting said block to a point of use.

5. The method set forth in claim 4 wherein the step of removing said block from said mold comprises raising said mold above a ground surface sufficiently to release said block from said mold, further including the steps:

attaching a loading harness to said block, positioning a transport vehicle having a tiltable load support bed adjacent one end of said mold with one end of said bed contiguous with said ground surface, and loading said block onto said bed.

6. A livestock feed product comprising:

a quantity of residue from the ginning of cotton, the major portion of the material of said residue comprising cotton burr coated with a settable liquid binder and compacted to form a substantially cohesive solid block transportable from a point of manufacture to a point of use, said block being formed of a plurality of layers of said material coated with said binder and then compacted, said layers being compacted one on top of the other to form said block, and said binder consisting essentially of a mixture of poly-n phosphate, vitamin A, vitamin B, urea and water.

* * * * *